June 15, 1926.
J. STURROCK
OIL TRAP FOR ROTARY ENGINES
Filed July 31, 1925
1,589,264
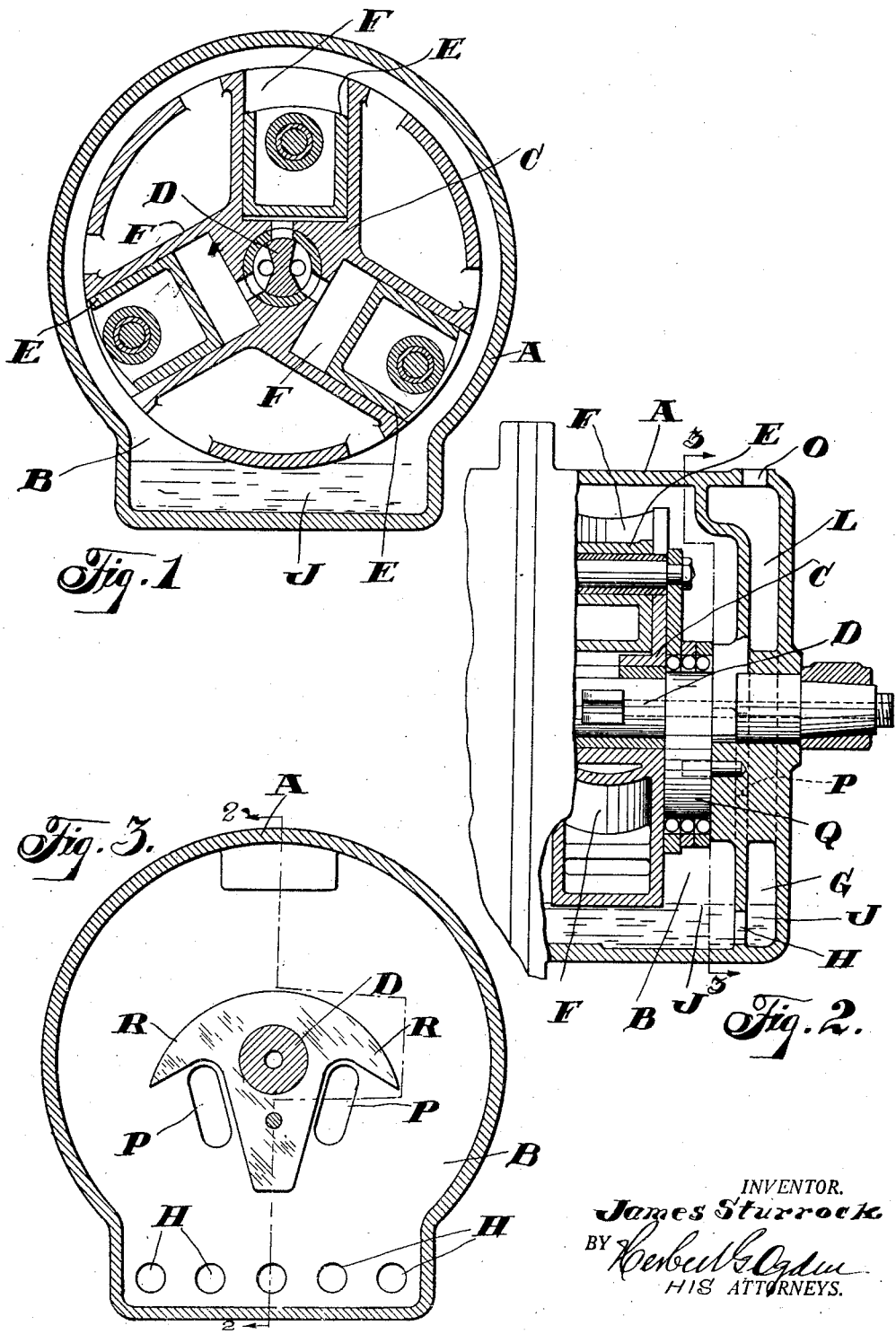

Patented June 15, 1926.

1,589,264

UNITED STATES PATENT OFFICE.

JAMES STURROCK, OF ATHENS, PENNSYLVANIA, ASSIGNOR TO INGERSOLL-RAND COMPANY, OF JERSEY CITY, NEW JERSEY, A CORPORATION OF NEW JERSEY.

OIL TRAP FOR ROTARY ENGINES.

Application filed July 31, 1925. Serial No. 47,247.

This invention relates to an oil trap for rotary engines, but more particularly to a device for preventing the oil or other lubricant from being carried out to atmosphere from the main portion of the motor casing.

The objects of the invention are to enable the lubricant to be separated from the air in a simple and efficient manner and permit the air under such pressure as is created in the motor casing to escape to atmosphere, while the oil is separated and falls into the lubricant chamber to be used over again in the motor chamber.

The oil or lubricant trap having a tortuous passage therethrough for carrying out the objects of the invention may conveniently be built into the casing of the machine and is primarily adapted for a rotary engine in which the rotary power member rotates about a horizontal axis.

Only so much of the moving parts of a rotary engine are illustrated as will serve to make the invention clear and in the drawings, Figure 1 is a diagrammatic transverse sectional view through the rotary cylinder motor, Figure 2 is a longitudinal sectional elevation partly broken away on the line 2—2 of Figure 3 looking in the direction of the arrows showing the oil trap, and Figure 3 is a transverse sectional elevation on the line 3—3 of Figure 2 looking in the direction of the arrows.

Referring to the drawings, the engine or motor casing A has a main portion or chamber B in which the rotary power member C rotates about the horizontal shaft D. The rotary power member may be of any suitable type and in this instance pistons E are indicated reciprocating in the cylinders F causing rotation of the main cylinder member by means of which power is transmitted to a suitable driving shaft (not shown). The pressure fluid for operating the pistons and the cylinders may be compressed air or other suitable motive fluid.

A lubricant chamber G as shown, is located at one side of the main portion of the engine casing and communicates at its bottom with said main portion through the aperture or apertures H. Lubricant, as for instance, lubricating oil J in the oil chamber G and in the bottom of the main portion B of the casing seals the aperture or apertures H and thus oil in the bottom of the casing is carried outwardly for lubricating purposes, due to the action of the power member.

The lubricant chamber G communicates outwardly with the atmosphere through the chamber L and the vent O at the top of the casing. The vented air from the main portion B of the casing enters the lubricant chamber through the apertures P in the side of the casing behind the crank disk or eccentric Q. These apertures P are located beneath the lips R on the casing which act as baffles and direct the air through the apertures P into the lubricant chamber.

The pressure created by the rotation of the power member in the casing causes a flow of lubricant carrying air out through the apertures P and passages connect therewith to the lubricant chamber and thence to atmosphere and in its passage the lubricant is separated from the air and clings to the walls of the lubricant chamber G and drains down into the oil chamber so that the oil is prevented from being carried out to atmosphere.

I claim:

1. In a rotary engine, the combination of a casing, a rotary power member rotatable about a horizontal axis within the main portion of the casing, a lubricant chamber at one side communicating at its bottom with the main portion of the casing, the upper portion of the chamber being vented to atmosphere, and ports in the casing adjacent the axis of rotation leading from the main portion of the main casing to the lubricant chamber, whereby the lubricant is separated from the air and drains back into the lubricant chamber.

2. In a rotary engine, the combination of a casing, a rotary power member rotatable about a horizontal axis within the main portion of the casing, a lubricant chamber at one side communicating at its bottom with the main portion of the casing, the upper portion of the chamber being vented to atmosphere, ports in the casing adjacent the axis of rotation leading from the main portion of the main casing to the lubricant chamber, and lips forming baffles on the casing for said ports, whereby the lubricant is separated from the air and drains back into the lubricant chamber.

In testimony whereof I have signed this specification.

JAMES STURROCK.